United States Patent [19]

Barkouskie

[11] Patent Number: 4,884,729
[45] Date of Patent: Dec. 5, 1989

[54] SPARE TIRE RACK

[75] Inventor: Ronnie Barkouskie, Mexia, Tex.

[73] Assignee: Dutton-Lainson Corporation, Hastings, Nebr.

[21] Appl. No.: 169,490

[22] Filed: Mar. 17, 1988

[51] Int. Cl.$^4$ ............................................. B62D 43/04
[52] U.S. Cl. ............................. 224/42.21; 224/42.23; 224/42.28; 414/463; 414/466
[58] Field of Search ............... 224/42.21, 42.23, 42.28, 224/42.06, 42.41; 414/463, 465, 917, 466; 296/37.2

[56] References Cited

U.S. PATENT DOCUMENTS

| 2,028,945 | 1/1936 | Morrison | 293/55 |
|---|---|---|---|
| 2,131,746 | 10/1938 | Morrison | 293/55 |
| 2,674,393 | 4/1954 | Clark | 414/465 |
| 3,187,914 | 6/1965 | Peras | |
| 3,782,568 | 1/1974 | Alexander | |
| 3,831,793 | 8/1974 | Eller | 224/42.21 |
| 3,865,264 | 2/1975 | Kuhns | |
| 3,952,894 | 4/1976 | Mendez | |
| 4,072,258 | 2/1978 | Cruson | 414/463 |
| 4,087,032 | 5/1978 | Miller et al. | 296/37.2 |
| 4,221,321 | 9/1980 | Wertjes | 224/42.21 |
| 4,492,506 | 1/1985 | Hoagland et al. | 414/463 |
| 4,522,325 | 6/1985 | McMillan | 224/42.21 |
| 4,573,855 | 3/1986 | Braswell | 414/463 |

Primary Examiner—Linda J. Sholl
Attorney, Agent, or Firm—Richards, Harris, Medlock & Andrews

[57] ABSTRACT

An improved tire rack (10) is disclosed for use on any vehicle, but which is particularly suitable for use on a pickup truck (12). Brackets (24, 26) are mounted on the frame members of the truck and support a rod (28) and arms (32, 36) for pivotal motion between a storage position and a release position. In the storage position, the spare tire is held horizontally against the bottom of the bed of the truck. When moved to the release position by rotating a worm gear (72) to pivot the sector gear (66) on the rod (28), the tire rack moves the spare tire below and behind the bumper of the vehicle for ready access.

9 Claims, 2 Drawing Sheets

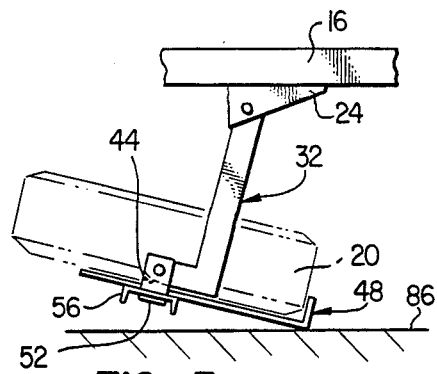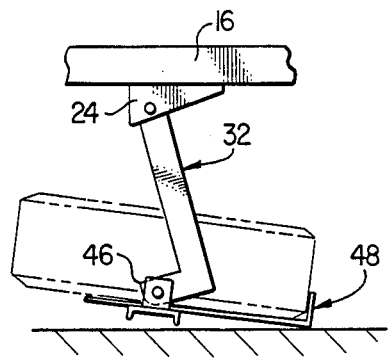
FIG. 3a  FIG. 3b
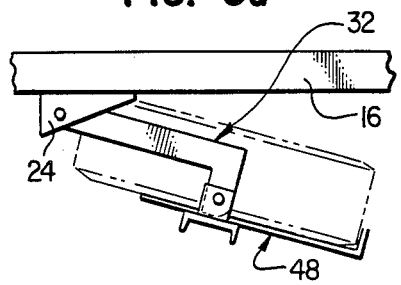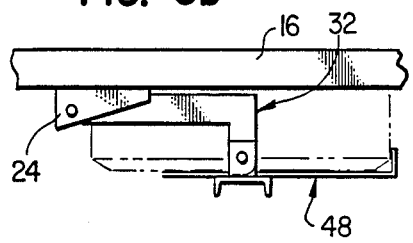
FIG. 3c  FIG. 3d
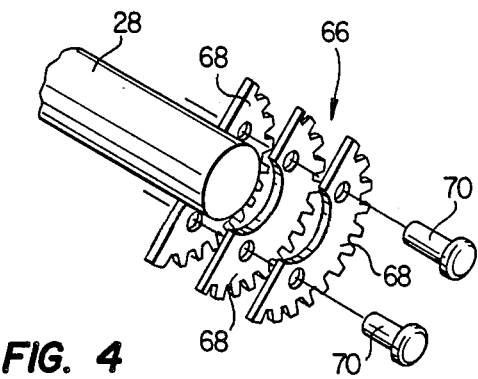
FIG. 4

4,884,729

SPARE TIRE RACK

TECHNICAL FIELD

This invention relates to vehicles, and particularly to a mechanism for storing and deploying a spare tire mounted on the vehicle.

BACKGROUND OF THE INVENTION

Virtually every vehicle in use today carries a spare tire for emergency purposes. A great many techniques have been used to store the spare tire within the vehicle, often without any concern to the convenience or ease of removing the tire for use. This lack of concern exists even though the very need for use of the spare implies an emergency situation has arisen where one of the tires on the vehicle has failed. Unfortunately, tires often fail in inconvenient locations and in inclement weather, situations which compound the difficulty of tire retrieval.

A number of attempts have been made in the past to simplify access to the stored spare tire. However, many of these designs are so complex as to be simply impracticable. Vehicle manufacturers are resistant to complicated mechanisms which are expensive to manufacture. Further the complexity of a device often decreases its reliability.

The problem of retrieving the spare tire is amplified when considering a vehicle such as a pickup, or other truck. The spare wheel can be very heavy and awkward for anyone. Even a spare tire used on a common passenger car can be quite difficult for an elderly or weaker person to work with.

Therefore, a need exists for a more effective way of storing and retrieving a spare tire within a vehicle which does not require the exertion of an extraordinary effort to retrieve the tire when needed.

SUMMARY OF THE INVENTION

In accordance with one aspect of the present invention, a spare tire rack is provided for holding a spare tire on a vehicle having parallel frame members. The rack includes first and second brackets, each mounted on one of the parallel frame members. A rod is pivotally supported between the first and second brackets for pivotal motion about a horizontal axis. A first arm, having an inner end and an outer end, is secured at its inner end to the rod proximate the first bracket. A second arm, also having an inner end and an outer end, is fastened at its inner end to the rod proximate the second bracket. A cross piece is pivotally connected between the first and second arms at their outer ends for limited pivotal motion relative to the arms, limited by a stop on one of the arms.

The arms, rod and cross piece form a movable section. Structure is provided for pivoting the movable section relative to the brackets between a storage position and a release position. The cross piece pivots against the stop proximate the storage position to store the tire horizontally while pivoting relative to the arms a the movable section moves to the release position to provide easy access to the tire. In accordance with another aspect of the present invention, the spare tire is held in the storage position between the cross piece and the rod. In accordance with another aspect of the present invention, the brackets are mounted underneath the vehicle proximate a bumper. As the movable section pivots to the release position, the spare tire is moved from under the vehicle, below the bumper to a position beyond the bumper for easy access to the tire.

In accordance with another aspect of the present invention, the pivoting structure includes a sector gear mounted on the rod proximate the first bracket. The second arm is shorter than the first arm to compensate for the elastic twisting of the rod to ensure that the tire is essentially level in the storage position. The tire also tilts downwardly as it moves away from the storage position which permits the tire to be removed from the rack without moving the rack completely to the release position. In the release position, the tire is directed upwardly for ease of access.

BRIEF DESCRIPTION OF THE DRAWINGS

For a more complete understanding of the present invention, and the advantages thereof, reference is now made to the following description, taken in conjunction with the accompanying drawings, in which:

FIGS. 3A-D illustrate the operation of the tire rack as it is moved between the storage and release positions; and FIG. 4 is an exploded perspective view of the sector gear used in the tire rack.

DETAILED DESCRIPTION

Figure 1:
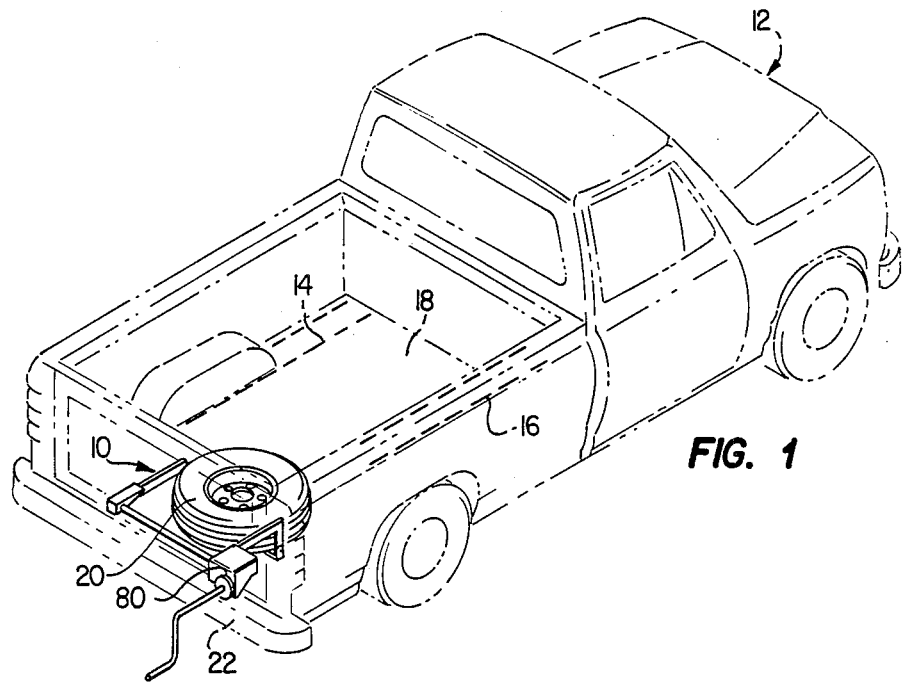
FIG. 1 is a perspective view of a tire rack forming a first embodiment of the present invention mounted on a pickup truck.

With reference now to FIG. 1, a tire rack 10 forming a first embodiment of the present invention is illustrated mounted on a pickup truck 12. The truck is of conventional construction, having a pair of parallel frame members 14 and 16 extending along the length of the vehicle on opposite sides of the center line of the vehicle. A truck bed 18 is supported on the frame members. In the storage position, the tire rack 10 holds the spare tire 20 against the bottom of the truck bed 18 between the frame members 14 and 16, providing excellent ground clearance (see FIG. 3D). When moved to the release position, the tire 20 has been lowered to ground level, moved behind the bumper 22 of the truck and tilted somewhat upwardly for ease of removal of the spare tire (see FIG. 3A).

Figure 2:
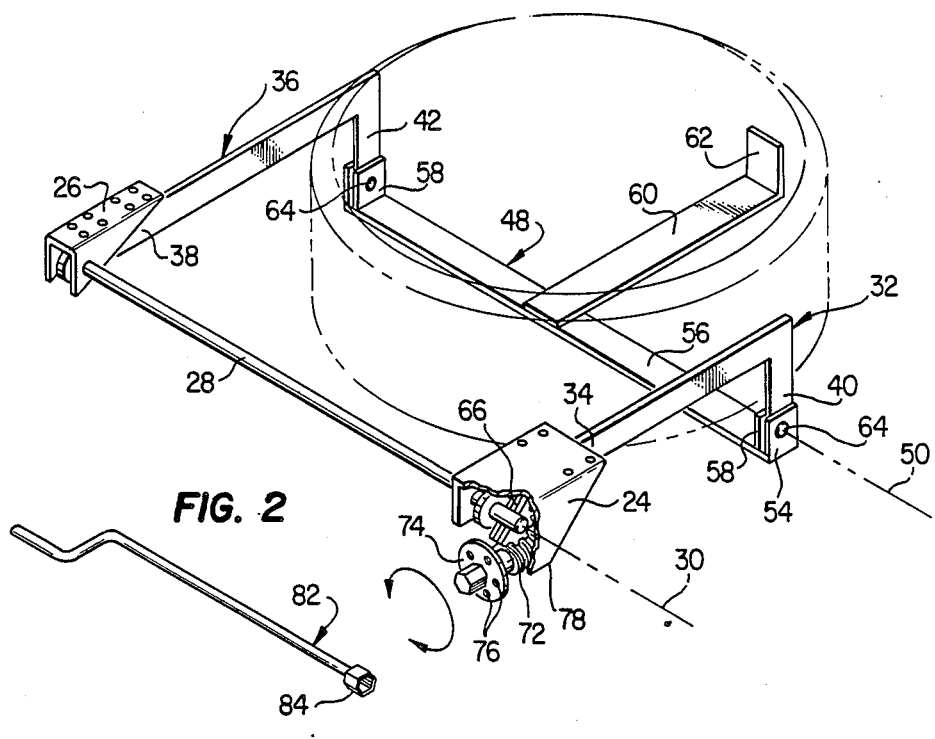
FIG. 2 is a perspective view of the tire rack.

With reference now to FIG. 2 and 3, details of the tire rack 10 will be described. The rack includes first and second brackets 24 and 26. Each bracket is mounted on one of the frame members of the truck. A rod 28 extends between the brackets and is mounted to the brackets for pivotal motion about a horizontal axis 30 which is generally perpendicular the center line of the truck. A first L-shaped arm 32 is secured to the rod at the inner end 34 of the arm proximate the first bracket. A second arm 36 is secured to the rod near the inner end 38 of the second arm. Again, second arm 36 is L-shaped as well. The outer end 40 of first arm 32 and outer end 42 of second arm 36 both form the shorter section of the L-shape for each arm. As will be clear from FIG. 3, one corner 44 of each outer end is rounded while the other corner 46 is formed by a sharp angle.

A cross piece 48 extends between the outer ends of the arms and is pivoted to the arms for pivotal motion about a horizontal axis 50. The cross piece 48 is formed of an angle member 52 having upturned ends 54, an overlying U-shaped channel 56 having upturned ends 58, and a tongue 60 having a upturned end 62. As can be seen from the drawings, ends 54 and 58 are paired and separated just far enough to permit the outer end of an arm to pass between and be pivoted thereto with pins 64 lying on axis 50. The cross piece 48 can pivot about axis 50 relative to the arms until a portion of the angle member 52 contacts the sharp corners 46 of the arms as shown in FIG. 3C.

At the end of rod 28 proximate the first bracket, a sector gear 66 is mounted. As best seen in FIG. 4, the sector gear is constructed of three individual gear pieces 68 bolted-together by bolts 70 to form the complete gear 66. This assembly permits the gear pieces to be stamped out of a sheet of metal without expensive gear cutting machines, but permits a strong gear to be formed by a placing multiple sections together to form a single, larger gear.

A worm gear 72 is mounted for rotation on the first bracket and engages the teeth of the sector gear 66. A locking plate 74 is mounted at one end of the gear 72 and has a plurality of holes 76 about its circumference. An L-shaped bracket 78 is mounted on the first bracket 24 so that a hole 76 can be aligned with a hole 80 formed in the bracket 78. A combination or key padlock can be passed through the aligned holes to lock the tire rack in the storage position.

A handle 82 with a shaped end 84 can be attached to the worm gear 72 to rotate the worm gear. The handle can be removably attached to the worm gear, or permanently mounted thereto as desired.

With reference now specifically to FIGS. 3A-D, the operation of the tire rack will be described. FIG. 3A illustrates the tire rack moved to the release position where the spare tire 20 can be easily pulled from the rack. When the tire is to be replaced, it is slid over the top of cross piece 48 so that the front portion of the tire contacts the end 62. The end 62 is positioned so that the center of mass of the tire and bracket lies forward of the axis 50, or to the right of axis 50 as shown in FIGS. 3A-D. The center of mass of the cross piece 48 without a tire resting on it also falls forward of the axis 50 so that the bottom of tongue 60 near the end 62 lies on the ground 86 when the rack is in the release position whether carrying a tire or not.

To move the spare tire to the storage position, the operator simply engages the handle 82 with the worm gear 72 and begins to rotate the worm gear. The worm gear, in turn, rotates sector gear 66 and rod 28 in the counter clockwise direction as shown in the FIGURE, with the arms pivoting about axis 50 relative to the cross piece with a portion of the cross piece still resting on the ground.

As shown in FIG. 3C, the arms will eventually pivot about axis 50 to the point where the sharp corners 46 of each arm contact the angle member 52. Pivotal motion of the arms relative to the cross piece is then no longer possible as the rack continues to be cranked to the storage position. In the position shown in FIG. 3C, the tire is tilted slighted down toward the front end, or right in the FIGURE.

However, if the vehicle is positioned so that there is insufficient clearance to fully move the rack to the release position, the cross piece 48 and tire 20 can be manually pivoted to tilt the tire the opposite way to slide the tire out of the rack.

As the worm gear continues to rotate, the back end, or left side of the tire in FIG. 3D, hits the bottom of the truck bed 18 and causes the tire and cross piece 48 to pivot slightly so that the tire ends up in the storage position essentially flat and pressed against the underside of the truck bed. The shorter portion of the second arm 36 is preferably somewhat shorter than the shorter portion of the first arm 32 to compensate for elastic twisting of the rod 28 resulting from the proximity of the sector gear near the first arm to provide a uniform holding force across the width of the tire and truck bed.

Deployment of the spare tire essentially operates in the reverse manner. It should be noted that the back end, or left side, of the tire as shown in FIGS. 3A-D passes beneath and behind the bumper 22 of the truck. This eliminates the need for the operator to reach beneath the truck to get the spare tire, making the task far easier. The pitch of the worm gear 72 and sector gear 66 is preferably such that the rack will be selfheld within a particular position with no need for any locking structure.

One rack constructed in accordance with the teachings of the present invention employed a rod 28 having a one inch diameter. The length of the shorter leg of the L-shaped arm 36 was one-half inch less than the length of the shorter leg of the first arm to compensate for the elastic twisting of the rod. The sector gear 66 was formed of three pieces, each having a one-eighth inch thickness bolted together to form a sector gear having a thickness of three-eighths inch.

While one embodiment of the present invention has been illustrated in the accompanying drawings, and described in the foregoing Detailed Description, it will be understood that the invention is not limited to the embodiment disclosed, but is capable of numerous rearrangements, modifications and substitutions of parts and elements without departing from the spirit of the invention.

I claim:

1. A spare tire rack for holding a spare tire on a vehicle having parallel frame members, comprising:
   a first bracket mounted to a first of said frame members;
   a second bracket mounted to the other of said frame members;
   a movable section including:
   (a) a rod pivotally supported between said first and second brackets for pivotal motion about a horizontal axis;
   (b) a first arm having an inner end and an outer end, said first arm secured at its inner end to the rod proximate the first bracket;
   (c) a second arm having an inner end and an outer end, said second arm secured at its inner end to the rod proximate the second bracket;
   (d) a cross piece pivotally connected between said first and second arms at the outer ends thereof for limited pivotal motion, a stop formed on at least one of said arms to limit the motion, the spare tire resting on the cross piece; and
   means for pivoting said movable section between a storage position proximate the parallel frame members and a release position, the cross piece pivoting against the stop proximate the storage position to store the tire horizontally, said cross piece pivoting relative said first and second arms as the movable section moves to the release position to provide easy access to the spare tire.

2. The spare tire rack of claim 1 wherein the spare tire is securely held between the rod and cross piece in the storage position.

3. The spare tire rack of claim 1 wherein the parallel frame members define a cavity therebetween, the spare tire positioned in the cavity in the storage position.

4. The spare tire rack of claim 1 wherein the distance between the inner end and outer end of said second arm is less than the distance between the inner end and the outer end of said first arm to compensate for the elastic twisting of the rod as it is pivoted by said means for pivoting to store the tire in a horizontal position.

5. The spare tire rack of claim 1 wherein a bumper is mounted at the ends of said parallel frame members, said first and second brackets being mounted proximate the bumper, the spare tire being positioned between the bumper and frame members in the storage position, said spare tire being moved beneath and away from the bumper when moved to the release position.

6. The spare tire of claim 1 wherein the cross piece contacts the ground as the tire is moved to the release position to tilt the spare tire upward for easy access in the release position.

7. The spare tire of claim 1 wherein the vehicle defines a cavity between said parallel frame members and a floor supported on said frame members, the spare tire being urged against the floor in the storage position.

8. The spare tire rack of claim 1 wherein said means for pivoting include a sector gear mounted on said rod proximate the first bracket and a worm gear mounted on the first bracket, engaging said sector gear.

9. A spare tire rack for holding a spare tire on a pickup truck having parallel frame members with a cavity therebetween to store the spare tire, a truck bed supported on the parallel frame members, comprising:
   a first bracket mounted to a first of said frame members;
   a second bracket mounted to a first other of said frame members;
   a movable section, including:
   (a) a rod pivotally mounted between said first and second brackets for pivotal motion about a horizontal axis;
   (b) a first L-shaped arm having a longer leg and a shorter leg, the first L-shaped arm having an inner end proximate the end of the longer leg and an outer end proximate the end of the shorter leg, its inner end fastened to the rod proximate the first bracket;
   (c) a second L-shaped arm having a longer leg and a shorter leg, said second L-shaped arm having an inner end proximate the end of the longer leg and an outer end proximate the end of the shorter leg, the distance between the inner end and outer end of the second L-shaped arm being slightly less than the distance between the inner end and the outer end of the first L-shaped arm, said second arm secured at its inner end to the rod proximate the second bracket;
   (d) a cross piece pivotally connected to said first and second arms at the outer ends thereof for limited pivotal motion about a horizontal axis, the spare tire resting on a cross piece, one corner of the outer end of each arm forming a stop to limit the pivotal motion of the cross piece; and
   a gear drive means for pivoting said movable section through the rod between a storage position, to store the spare tire between the frame members against the bottom of the truck bed, and a release position, with the spare tire position for ready access, the corners on said arms forming a stop limiting the pivotal motion of the cross piece as the movable section approaches the storage position to situate the spare tire horizontally against the bottom of the truck bed.

* * * * *